United States Patent [19]
Watanabe et al.

[11] Patent Number: 5,606,536
[45] Date of Patent: Feb. 25, 1997

[54] OPTICAL RECORDING/REPRODUCING APPARATUS WITH VARIABLE CONTROL

[75] Inventors: Katsuya Watanabe, Suita; Hiroshi Idehara, Nara, both of Japan

[73] Assignee: Matsushita Electric Industrial Co., Ltd., Kadoma, Japan

[21] Appl. No.: 443,629

[22] Filed: May 18, 1995

[30] Foreign Application Priority Data

May 20, 1994 [JP] Japan ................................. 6-105820

[51] Int. Cl.⁶ ........................................................ G11B 7/00
[52] U.S. Cl. ............................... 369/44.36; 369/44.35; 369/54
[58] Field of Search .............................. 369/44.35, 44.36, 369/124, 54, 58, 44.28, 44.29, 32; 371/10.2, 11.1, 11.3, 68.1–68.3; 360/77.03, 77.04, 77.06

[56] References Cited

U.S. PATENT DOCUMENTS

| | | |
|---|---|---|
| 4,718,057 | 1/1988 | Venkitakrishnan ................. 370/55 |
| 4,755,980 | 7/1988 | Yoshimani et al. ................. 369/54 |
| 5,243,581 | 9/1993 | Yuji et al. ....................... 369/58 X |
| 5,289,451 | 2/1994 | Ahsinuma et al. ............. 369/44.29 X |
| 5,473,550 | 12/1995 | Cameron et al. ............. 369/44.35 X |

FOREIGN PATENT DOCUMENTS

| | | |
|---|---|---|
| 464925 | 2/1992 | Japan . |
| 4299398 | 10/1992 | Japan . |

Primary Examiner—Thang V. Tran
Attorney, Agent, or Firm—Renner, Otto, Boisselle & Sklar

[57] ABSTRACT

At the turning on of the power of the optical recording/reproducing apparatus, or immediately after the reset of the optical recording/reproducing apparatus, the CPU sets parameters in the RAM of the DSP in accordance with the kind of software of the DSP, the model of the optical recording/reproducing apparatus, the characteristics of the head actuator, and the like. Thus, a control system in the DSP is constructed so that the control system is adapted to the corresponding head actuator and drive. Accordingly, even when the specifications or models of head actuators are changed, and moreover when the optical recording/reproducing apparatus is provided with a plurality of heads and drives, the control can be performed by one and the same CPU. As a result, it is possible to provide an optical recording/reproducing apparatus at a low cost and with high producibility.

14 Claims, 8 Drawing Sheets

OPTICAL RECORDING/REPRODUCING APPARATUS WITH VARIABLE CONTROL

BACKGROUND OF THE INVENTION

1. Field of the Invention

The present invention relates to an optical recording/reproducing apparatus for optically recording a signal on a recording medium (a disk) and/or for optically reproducing the recorded signal by using a light beam from a light source such as a laser. More particularly, the present invention relates to an optical recording/reproducing apparatus equipped with a digital signal processor which is used for the control of a light-beam spot such as focus servo for converging a light beam on a recording medium in a predetermined convergence condition and tracking servo for allowing the light-beam spot to precisely scan a track on the recording medium.

2. Description of the Related Art

An optical recording/reproducing apparatus for recording and/or reproducing information on or from a disk-like recording medium (hereinafter simply referred to as a disk) such as an optical disk and a magneto-optical disk applies a light beam onto a desired track on the disk, and detects the information on the basis of the reflected light beam. Accordingly, in such an apparatus, it is necessary to precisely converge the light beam on the desired track in a predetermined convergence condition. The control of the light-beam spot is performed by a disk-drive control device.

A disk-drive control device is provided with filters for servo systems such as focus servo for converging the light beam on a recording medium in a predetermined convergence condition and tracking servo for allowing the light-beam spot to precisely scan a track on the recording medium. In a conventional disk-drive control device, such servo-system filters are implemented as digital filters which perform operations. The disk-drive control device includes two processors. One of the processors is a digital signal processor (hereinafter referred to as a DSP) including digital filters. The other is a central processing unit (hereinafter referred to as a CPU) which performs the control of the whole disk drive including the DSP and performs the management of communication and data transfer between a host computer and disk drive in the optical recording/reproducing apparatus. The configuration of the conventional disk-drive control device equipped with the CPU and the DSP is shown in FIG. 10.

A CPU 303 sends commands such as focus-servo ON (FCON) end tracking-servo ON (TRON) to a DSP 302 in order to perform the recording or reproducing of information, in accordance with the requirement from a host computer 301 of an optical recording/reproducing apparatus. When the DSP 302 receives these commands, it allows the focus servo and tracking servo to operate, and accordingly controls a focus actuator 131 and a tracking actuator 103 so that a light beam follows the desired track on a disk. When a SEEK command is sent from the CPU 303, the DSP 302 drives a moving device, for example, a linear motor 304 for moving an objective lens (not shown), the focus actuator 131, the tracking actuator 103, and the like in a radius direction of the disk. In this way, the seek operation for a desired track onto or from which the information is to be recorded or reproduced.

In the DSP 302, gains or phases of frequency characteristics of filters used for focus servo and tracking servo are determined in view of the sensitivity of the moving device such as an actuator and a linear motor used in the disk drive, and frequency characteristics of a movable portion such as a resonance frequency. The movable portion is a portion including a head and at least one actuator for moving the head. The software of the DSP 302 is set so that digital filters which perform the operations in accordance with the software have the determined frequency characteristics. Thereafter, the software of the DSP 302 serves as a mask ROM. Accordingly, if the types of actuators used in respective models of disk drives are different from each other, the DSP cannot be used in common among the different models of disk drives, but it is necessary to provide original or dedicated DSPs for the respective models of disk drives. Moreover, it is necessary to design the hardware and the software of the CPU which controls the DSPs, in accordance with the types of the DSPs. This means that it is necessary to provide CPUs respectively for corresponding types of DSPs.

In recent years, the optical recording/reproducing apparatus is required to include a plurality of disk drives in one housing for the purpose of media conversion or backup. As shown in FIG. 11, in such an apparatus, each of the plurality of drives includes a head for a corresponding one of various media such as CD, 3.5" MO, 5" PCR, PD, and MD. In such an apparatus, original or dedicated DSP and CPU corresponding to the type of the head are provided in each drive, and a further CPU for managing the whole of the plurality of drives is required. Accordingly, the production cost of the apparatus including a plurality of drives is very high.

A recording/reproducing apparatus dedicated for one kind of medium which is a general type such as an MO recording/reproducing apparatus or a PD recording/reproducing apparatus is equipped with one head, and one DSP and one CPU for controlling the head. Such a general type of recording/reproducing apparatus also has, for example, the following drawback. In order to develop the models, if the specifications of a head or the specifications of an actuator are changed for reducing the production cost, or for improving the characteristics, it is necessary to accordingly change the software of the DSP. However, the software of the DSP is implemented as a mask ROM, so that it is very difficult to change the software. In order to widely and easily accommodate the change of specifications of the head and actuator, it is required that various kinds of software for allowing the change of specifications are stored in the ROM of the DSP. This necessitates the memory having a very large capacity. Therefore, the production cost of the DSP itself is high, and hence the production cost of the whole apparatus is correspondingly high, too.

SUMMARY OF THE INVENTION

The optical recording/reproducing apparatus for optically recording information onto a recording medium and/or for optically reproducing the information from the recording medium of this invention, includes: converging means for converging a light beam on the recording medium; moving means for moving the converging means; variable control means for obtaining an amount of movement based on a signal obtained from the light beam reflected from the recording medium, and for controlling the moving means to move the converging means by the amount of movement; and a main control section for defining an operation for obtaining the amount of movement from the signal in accordance with characteristics of the converging means and the moving means and characteristics of the recording medium, and for controlling the variable control means to obtain the amount of movement by performing the defined operation.

In one embodiment of the invention, the main control section includes: first memory means for previously storing a plurality of parameter sets each including a plurality of parameters; and means for selecting one of the plurality of parameter sets in accordance with the characteristics of the converging means and the moving means and the characteristics of the recording medium, and for transferring the parameters of the selected set to the variable control means, thereby defining the operation for obtaining the amount of movement from the signal.

In another embodiment of the invention, the variable control means includes second memory means for storing the parameters of the set transferred from the main control section.

In still another embodiment of the invention, the variable control means includes third memory means for previously storing apparatus information indicating the characteristics of the converging means and the moving means and the characteristics of the recording medium, and the main control section receives the apparatus information from the third memory means of the variable control means, determines the characteristics of the converging means and the moving means and the characteristics of the recording medium based on the received apparatus information, and selects one of the plurality of parameter sets based on the determined result.

In still another embodiment of the invention, the definition of the operation by the main control section in accordance with the characteristics of the converging means and the moving means and the characteristics of the recording medium is performed immediately after a power of the optical recording/reproducing apparatus is turned on, or immediately after the optical recording/reproducing apparatus is reset.

In still another embodiment of the invention, the optical recording/reproducing apparatus includes a plural number of the converging means, a plural number of the moving means, and a plural number of the variable control means, the number of the moving means and the number of the variable control means being equal to the number of the converging means, the variable control means all having identical hardware, and the main control section selects and transfers, to each of the variable control means, one of the plurality of parameter sets in accordance with characteristics of corresponding converging means and moving means and characteristics of a corresponding recording medium.

Alternatively, the optical recording/reproducing apparatus for optically recording information onto a recording medium and/or for optically reproducing the information from the recording medium of this invention, includes: converging means for converting a light beam on the recording means; moving means for moving the converging means in a focus direction which is perpendicular to a surface of the recording medium, and in a tracking direction which is a radius direction of the recording medium; variable control means for calculating an amount of movement in the focus direction and an amount of movement in the tracking direction by processing a signal obtained from the optical beam reflected from the recording medium by using a plurality of parameters, and for controlling the moving means to move the converging means by the amount of movement in the focus direction and the amount of movement in the tracking direction; and a main control section for setting the plurality of parameters in accordance with characteristics of the converging means and the moving means, and for applying the plurality of parameters to the variable control means.

In one embodiment of the invention, the recording medium is an optical disk.

In another embodiment of the invention, the recording medium is a magneto-optical disk.

In still another embodiment of the invention, the variable control means is a digital signal processor.

In still another embodiment of the invention, the digital signal processor includes a digital filter having a variable frequency characteristic, and the plurality of parameters include a coefficient which determines the frequency characteristic of the digital filter.

In still another embodiment of the invention, the digital signal processor includes a circuit for adjusting a gain of a signal, and the plurality of parameters include a value of the gain adjusted by the circuit.

Thus, the invention described herein makes possible the advantages of (1) providing an optical recording/reproducing apparatus with high reliability that can be produced at a low cost, in which the control can be performed by one and the same CPU and one and the same software, irrespective of the types of the disk drives, and (2) providing an optical recording/reproducing apparatus produced at a low cost, in which a plurality of drives are mounted.

These and other advantages of the present invention will become apparent to those skilled in the art upon reading and understanding the following detailed description with reference to the accompanying figures.

DESCRIPTION OF THE PREFERRED EMBODIMENTS

Figure 1:
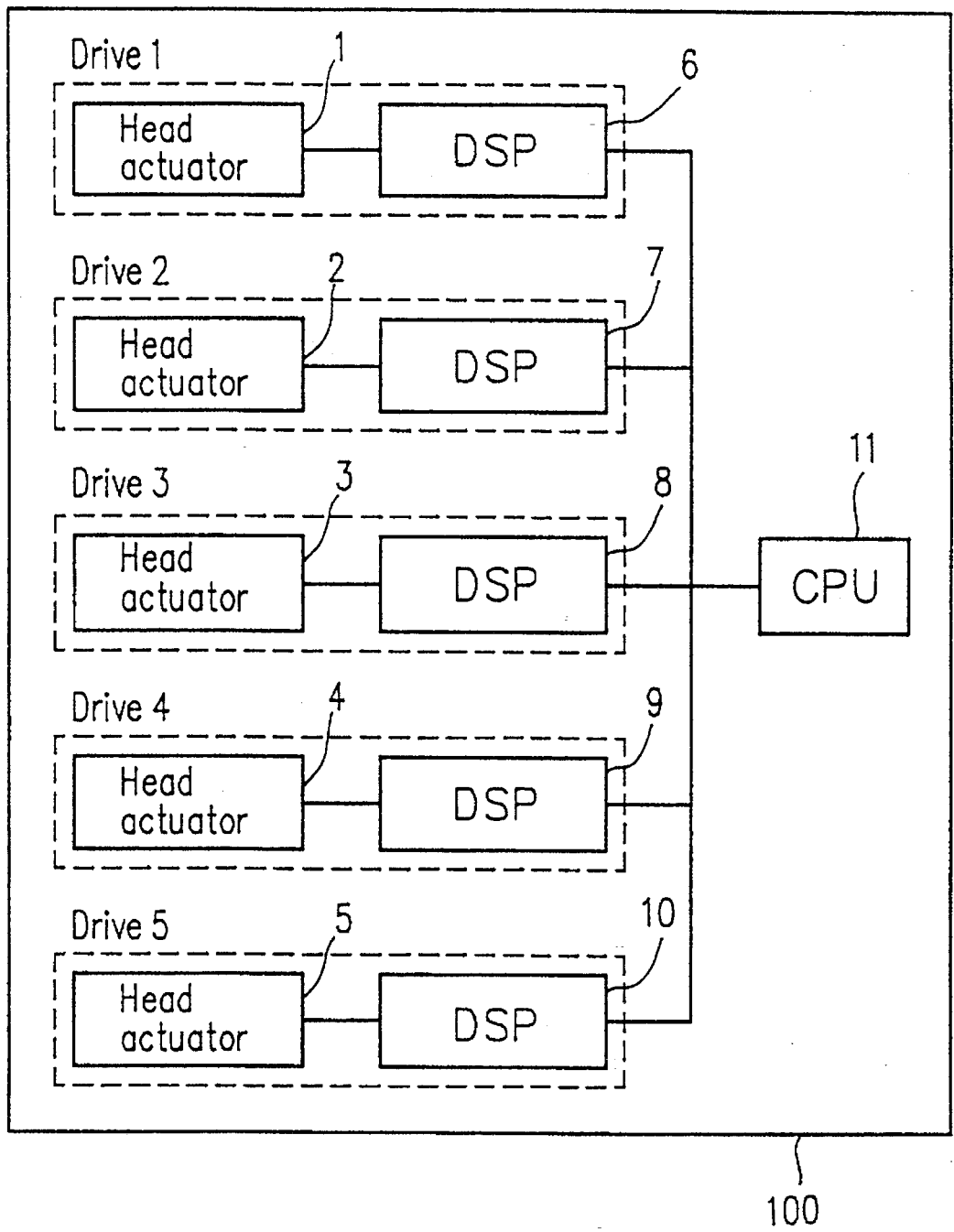
FIG. 1 is a block diagram schematically showing a configuration of an optical recording/reproducing apparatus of the invention in which a plurality of disk drives are mounted.

Hereinafter, the present invention will be described by way of illustrative examples with reference to the accompanying drawings. In the figures, the same components as those described in the prior art example are indicted by the same reference numerals.

FIG. 1 is a block diagram showing a configuration of a disk-drive control device of an optical recording/reproducing apparatus 100 of this example. The optical recording/reproducing apparatus 100 includes a plurality of drives each having a head actuator and a DSP. The plurality of drives are managed and controlled by one CPU. Each of a plurality of head actuators 1 to 5 is used for recording and reproducing information onto or from the corresponding one of various different media. Therefore, the specifications of the plurality of head actuators 1 to 5 are different from each other. Hereinafter, the term "a head actuator" indicates a portion including a head and an actuator for driving the head. DSPs 6 to 10 are constructed by the same and common hardware and software. However, the specifications of the head actuators 1 to 5 and the types of media for which the recording and reproducing is to be performed are different from each other, so that parameters used in the DSPs 6 to 10 such as coefficients of digital filters are differently set for each of the DSPs.

A CPU 11 includes a ROM in which a plurality of sets of parameters for various media, and various specifications of a head actuator are previously stored. The CPU 11 selects one of the plurality of sets which is optimal to each DSP on the basis of the information from the DSP, and sends the selected set of parameters to the DSP. Each DSP determines the processing which is actually performed by the digital filters and the like, using the received parameters.

The transfer of the parameters of the selected set is performed in the following manner. When the power of the optical recording/reproducing apparatus 100 is turned on, the CPU 11 sends a signal to each of the DSPs 6 to 10 for checking whether or not each DSP is ready to operate. If each of the DSPs 6 to 10 is ready, the DSP sends a signal indicating the specifications of the head actuator which is controlled by the DSP and the type of medium which is recorded or reproduced by the DSP, as the response to the CPU 11. The CPU 11 transfers a set of parameters including the coefficients and gains of filters and the like to the DSP, on the basis of the response signal. In this way, the CPU 11 transfers the parameters corresponding to the specifications of head actuators and the types of media, respectively to the plurality of DSPs. In this example, it is assumed that one set of parameters includes the coefficients and gains of the filters in each DSP.

Next, the configuration and the operation of one disk drive including one head and one DSP will be described with reference to FIGS. 2 and 3. The configurations and the operations of the other disk drives are the same as those described below, except that the specifications of the heads are different, and hence the parameters for determining the characteristics of filters, circuits, and the like in the DSPs are different.

Figure 2:
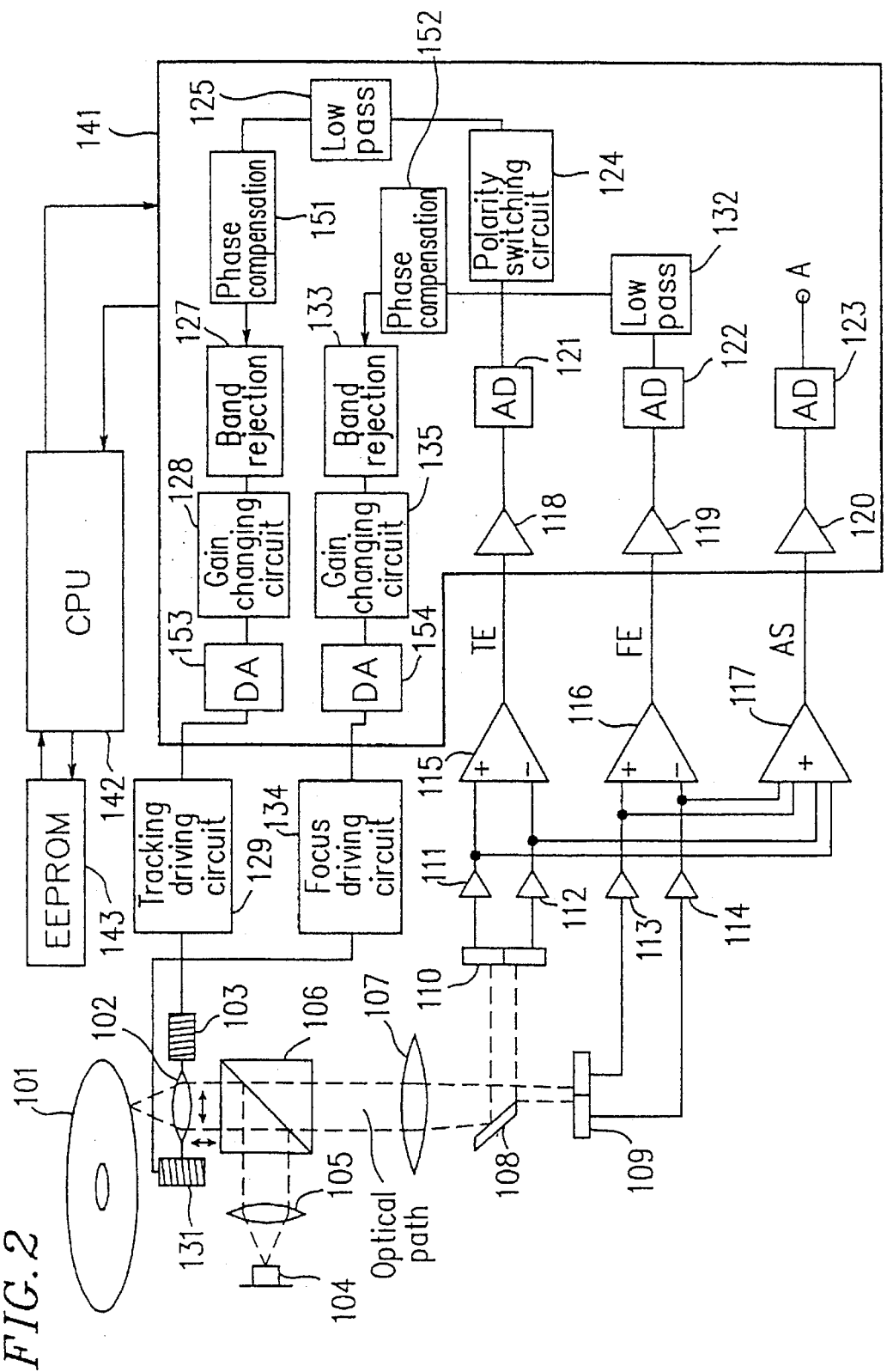
FIG. 2 is a block diagram showing a detailed configuration of a disk-drive control device.

FIG. 2 is a block diagram showing the configuration of one disk drive in the optical recording/reproducing apparatus 100.

A light beam generated from a light source 104 such as a laser diode is collimated by a coupling lens 105, and reflected by a polarization beam splitter 106. The reflected light beam is converged on an optical disk 101 by an objective lens 102.

The converged light beam is reflected by the optical disk 101, and is incident on a collimator lens 107 after passing through the objective lens 102 and the polarization beam splitter 106 in this order. The light beam is reduced by the collimator lens 107, and split into two beams by a half mirror 108. One of the split light beams is input into a photodetector 109 and the other split light beam is input into a photodetector 110. Both of the photodetectors 109 and 110 are two-divided photodetectors. Each of the photodetectors 109 and 110 converts the input light beam into an electric signal, and outputs the electric signal.

The electric signal from the photodetector 110 is input into a differential amplifier 115 via preamplifiers 111 and 112. The electric signal from the photodetector 109 is input into a differential amplifier 116 via preamplifiers 113 and 114. The electric signals from the photodetectors 109 and 110 are also input into a summing amplifier 117. An output TE of the differential amplifier 115 is used as a tracking error signal indicating the positional relationship between the light beam converged on the optical disk 101 and the target track. An output FE of the differential amplifier 116 is used as a focus error signal indicating the convergence condition of the light beam on the optical disk 101. An output AS of the summing amplifier 117 is used as a signal indicating the total amount of reflected light from the optical disk 101.

These signals TE, FE, and AS are input into a DSP 141 and then the levels of the signals TE, FE, and AS are attenuated to appropriate levels by respective attenuators 118, 119, and 120. The DSP 141 performs prescribed operations for the signals TE and FE, and the processed signals are applied to a tracking driving circuit 129 and a focus driving circuit 134, respectively. The tracking driving circuit 129 drives a tracking actuator 103 in accordance with the tracking error signal TE which has been processed by the DSP 141, so that the objective lens 102 is moved in the radius direction of the optical disk 101. In this way, the tracking servo for precisely converging the light beam on the target track is performed. The focus driving circuit 134 drives a focus actuator 131 in accordance with the focus error signal FE which has been processed by the DSP 141, so that the objective lens 102 is moved in a direction perpendicular to the surface of the optical disk 101. In this way, the focus servo for always converging the light beam on the optical disk 101 in a predetermined convergence condition is performed.

In the DSP 141, the signals TE, FE, and AS from the attenuators are input into analog-to-digital converters (hereinafter referred to as AD converters) 121, 122, and 123, respectively. Each of the AD converters converts the input analog signal into a digital value of 8 bits, for example, and outputs the digital value. The focus error signal FE output from the AD converter 122 is input into a gain changing circuit 135 for gain adjustment via filters 132, 152, and 133 in this order. Herein, the filter 132 is a low-pass filter for removing higher-frequency noises, the filter 152 is a phase-compensation filter for compensating the phase of the focus servo system, and the filter 133 is a band rejection filter for trapping the higher-order resonance of the focus actuator 131 and ensuring a gain margin. These filters 132, 152, and 133 are digital filters which perform operations in accordance with the software of the DSP 141. The gain changing circuit 135 is constructed by a multiplier, a barrel shifter, or the like, which performs operations in accordance with the software. The focus error signal having a gain adjusted in the gain changing circuit 135 is output to the focus driving circuit 134 via a DA converter 154.

The tracking error signal TE output from the AD converter 121 is input into a gain changing circuit 128 via a polarity switching circuit 124 for selecting an inverted polarity or a non-inverted polarity for the tracking, and via a low-pass filter 125, a phase-compensation filter 151, and a band rejection filter 127 in this order. The tracking error signal having a gain adjusted in the gain changing circuit 128 is output from the DSP 141 via a DA converter 153, and applied to the tracking driving circuit 129.

The signal AS which is digitized by the AD converter 123 is used for indicating the sum of the amount of light reflected from the optical disk 101. For example, a division is performed by using the sum of the amount of light, so that the signals TE and FE are normalized.

Figure 3:
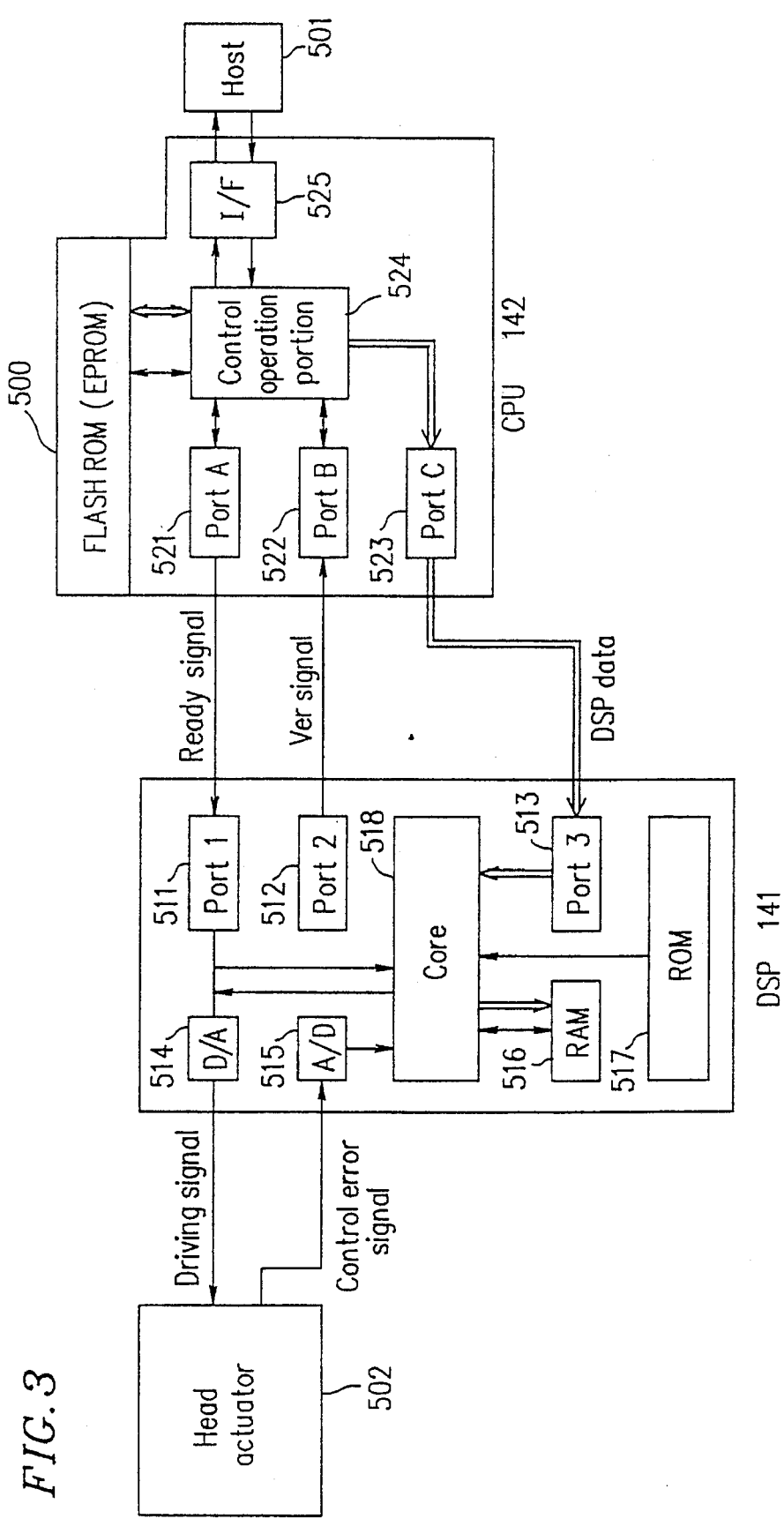
FIG. 3 is a block diagram showing a hardware configuration of a DSP and a CPU in this invention.

The hardware configuration of the DSP 141 and the CPU 142 are shown in FIG. 3. As shown in FIG. 3, the DSP 141 includes a random access memory (RAM) 516 and a ROM 517 for implementing the software. The ROM 517 stores a program in a nonvolatile manner, in which the software is represented by codes. The ROM 517 stores the information related to the version, the type, and the like of the DSP, or the information related to the version, the type, and the like of the software for operating the DSP, as the apparatus information. The information is stored in the form of codes. The information related to the version and the like of the DSP and the information related to the version and the like of the software are different depending on the characteristics of the head actuator and the kind of medium. Accordingly, based on the stored apparatus information, it is possible to determine the characteristics of head actuator and the kind of medium.

As described above, when the power of the optical recording/reproducing apparatus 100 is turned on, the CPU 142 starts the setting operation of the parameters in the DSP 141, in accordance with the program stored in the FLASHROM 500. First, a control operation portion 524 sends a READY signal to the DSP 141 via port A in order to check whether or not the DSP 141 is ready. The READY signal is input to port 1 of the DSP 141, and sent to a core 518. When the core 518 receives the READY signal, it sends the apparatus information stored in the ROM 517 as a signal VER to the CPU 142 via port 2, in accordance with the program stored in the ROM 517. The signal VER is input to port B of the CPU 142, and sent to the control operation portion 524. The control operation portion 524 determines the characteristics of the head actuator, and the type of medium to which the drive performs the recording and reproducing operation based on the above-described apparatus information. Depending on the determined result, the control operation portion 524 selects one of a plurality of sets of parameters including coefficients of digital filters and change values for the gain changing circuits which are stored in the FLASHROM 500. The parameters of the selected set are sequentially transferred from port C to the DSP 141. The DSP 141 receives the sequentially sent parameters at port 3, and stores these parameters in the RAM 516. The DSP 141 determines the characteristics of each filter by using the parameters stored in the RAM 516, whereby a control system which is optimal to the characteristics of head actuator and The kind of medium is automatically constructed.

When the transfer of parameters to the DSP 141 is completed, the CPU 142 sends commands such as spindle-motor ON, focus-servo ON, tracking-servo ON to the DSP 141 from port A. The DSP 141 actuates the disk drive in accordance with these commands. When the disk drive is actuated, the CPU 142 sends an OK signal indicating that the disk drive is actuated, to a host computer 501 of the optical recording/reproducing apparatus 100 via an I/F 525.

Next, the setting of characteristics of filters, circuits, and the like in the DSP 141 using the transferred parameters will be described with reference to FIGS. 4 to 9B.

Figure 4:
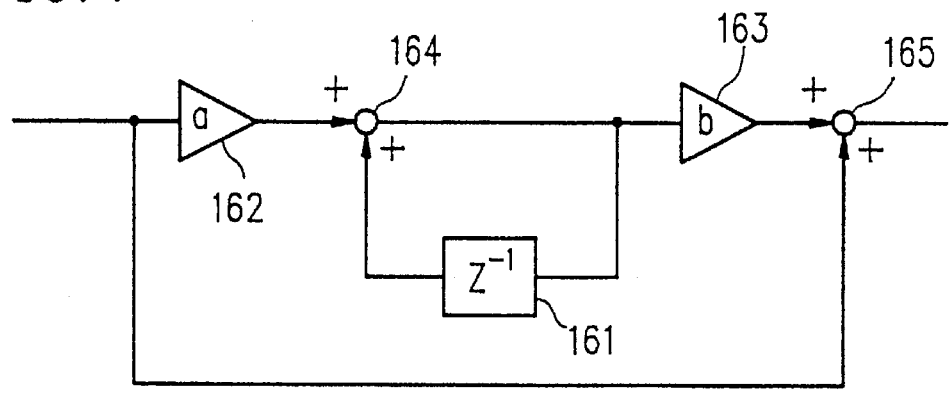
FIG. 4 is a block diagram showing an exemplary configuration of a low-pass filter in the DSP according to the invention.
Figure 5A:
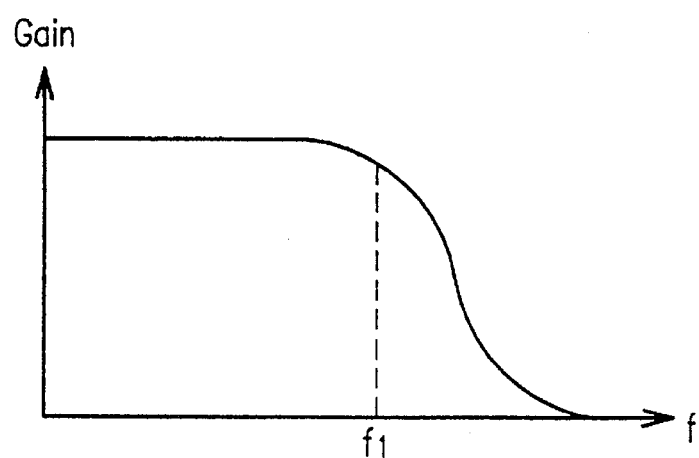
FIGS. 5A and 5B are diagrams showing exemplary frequency characteristics of the low-pass filter shown in FIG. 4.
Figure 5B:
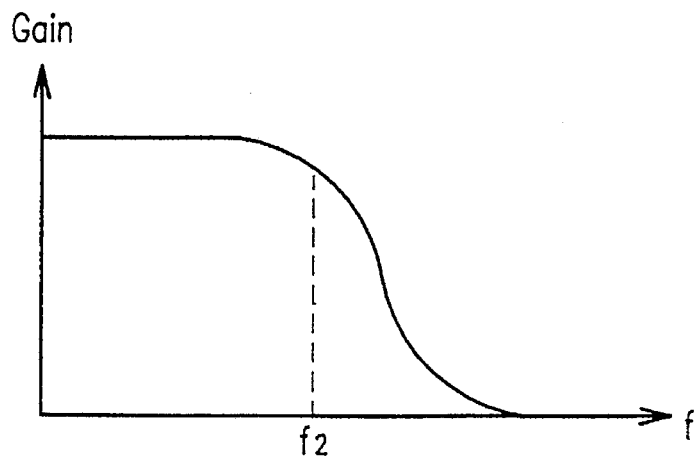

FIG. 4 is a block diagram showing an exemplary configuration of a low-pass filter. As shown in FIG. 4, the low-pass filter includes a delay 161 indicated by $Z^{-1}$, multipliers 162 and 163, and adders 164 and 165. Multipliers a and b of the multipliers 162 and 163 are the values which are changed in accordance with the characteristics of the head actuator. These values are transferred from the CPU 142. By changing the multipliers a and b, it is possible to change the cut-off frequency of the low-pass filter in accordance with the characteristics of the head actuator. FIGS. 5A and 5B show the frequency characteristics of the low-pass filter shown in FIG. 4 when the cut-off frequency is changed from f1 to f2.

Figure 6:
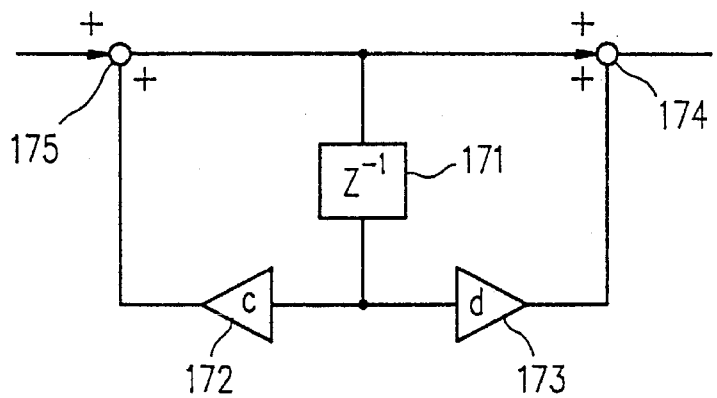
FIG. 6 is a block diagram showing an exemplary configuration of a phase-compensation filter in the DSP according to the invention.
Figure 7A:
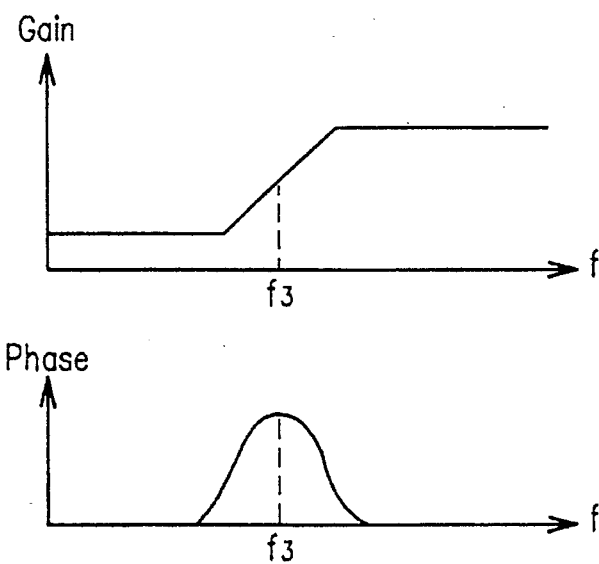
FIGS. 7A and 7B are diagrams showing exemplary frequency characteristics of the phase-compensation filter shown in FIG. 6.
Figure 7B:
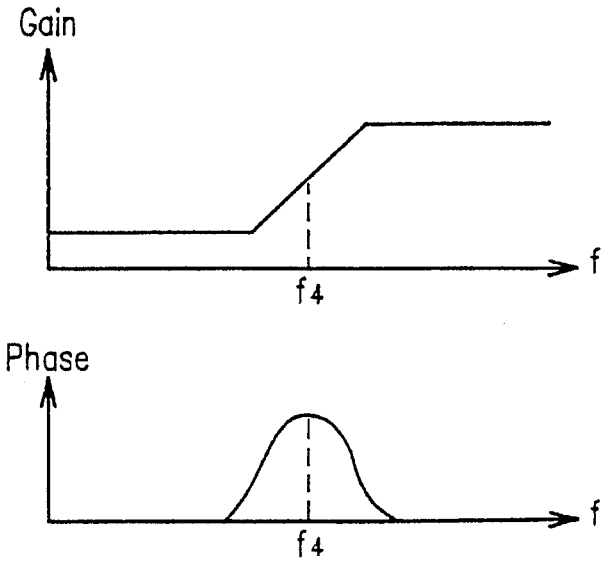

FIG. 6 is a block diagram showing an exemplary configuration of a phase-compensation filter. As shown in FIG. 6, the phase-compensation filter includes a delay 171 indicated by $Z^{-1}$, multipliers 172 and 173, and adders 174 and 175. Multipliers c and d of the multipliers 172 and 173 are the values which are set by the CPU 142. By changing the multipliers c and d, it is possible to change the frequency at which the delay or advance of phase is the maximum in accordance with the characteristics of the head actuator. FIGS. 7A and 7B show the frequency characteristics of the phase-compensation filter when the frequency at which the delay or advance of phase is the maximum is changed from f3 to f4.

Figure 8:
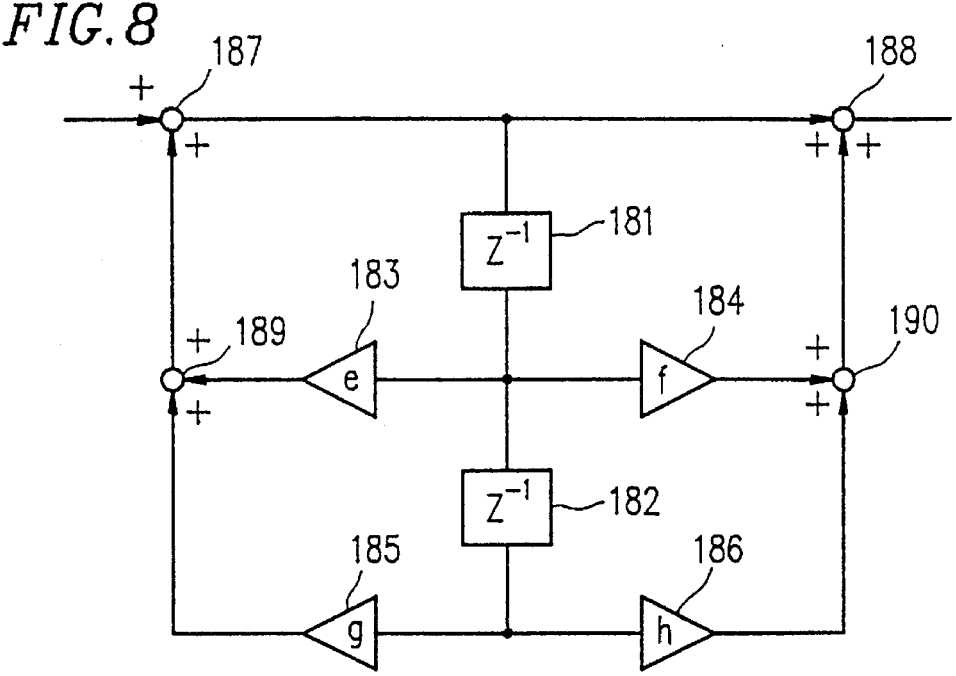
FIG. 8 is a block diagram showing an exemplary configuration of a band rejection filter in the DSP according to the invention.
Figure 9A:
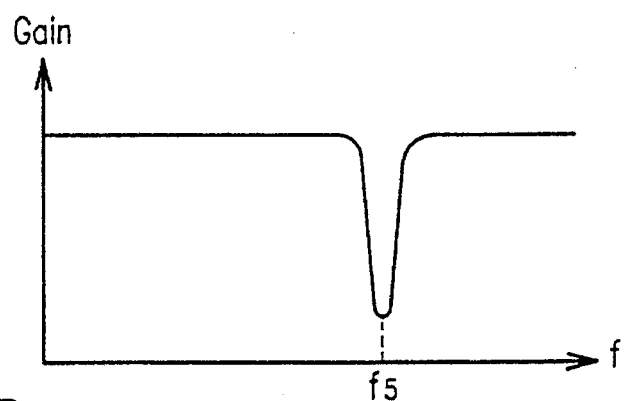
FIGS. 9A and 9B are diagrams showing exemplary frequency characteristics of the band rejection filter shown in FIG. 8.
Figure 9B:
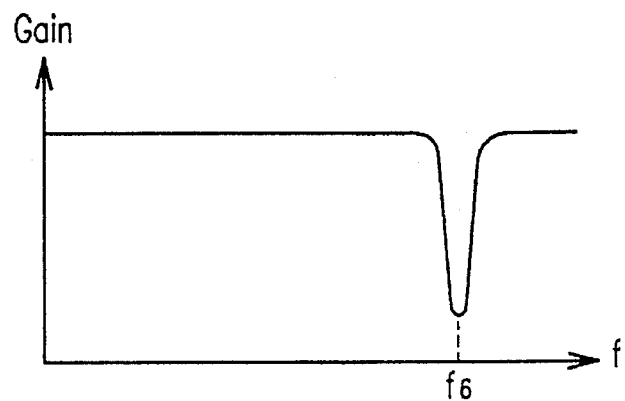
Figure 10:
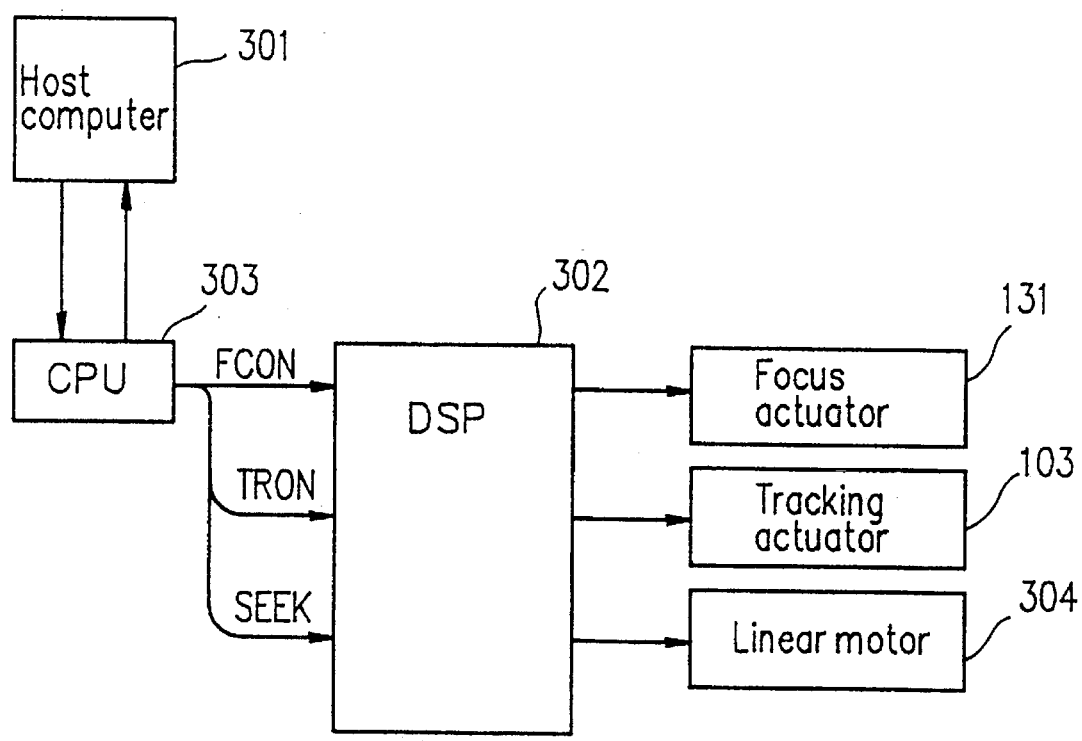
FIG. 10 is a block diagram showing part of a configuration of a conventional disk-drive control device.
Figure 11:
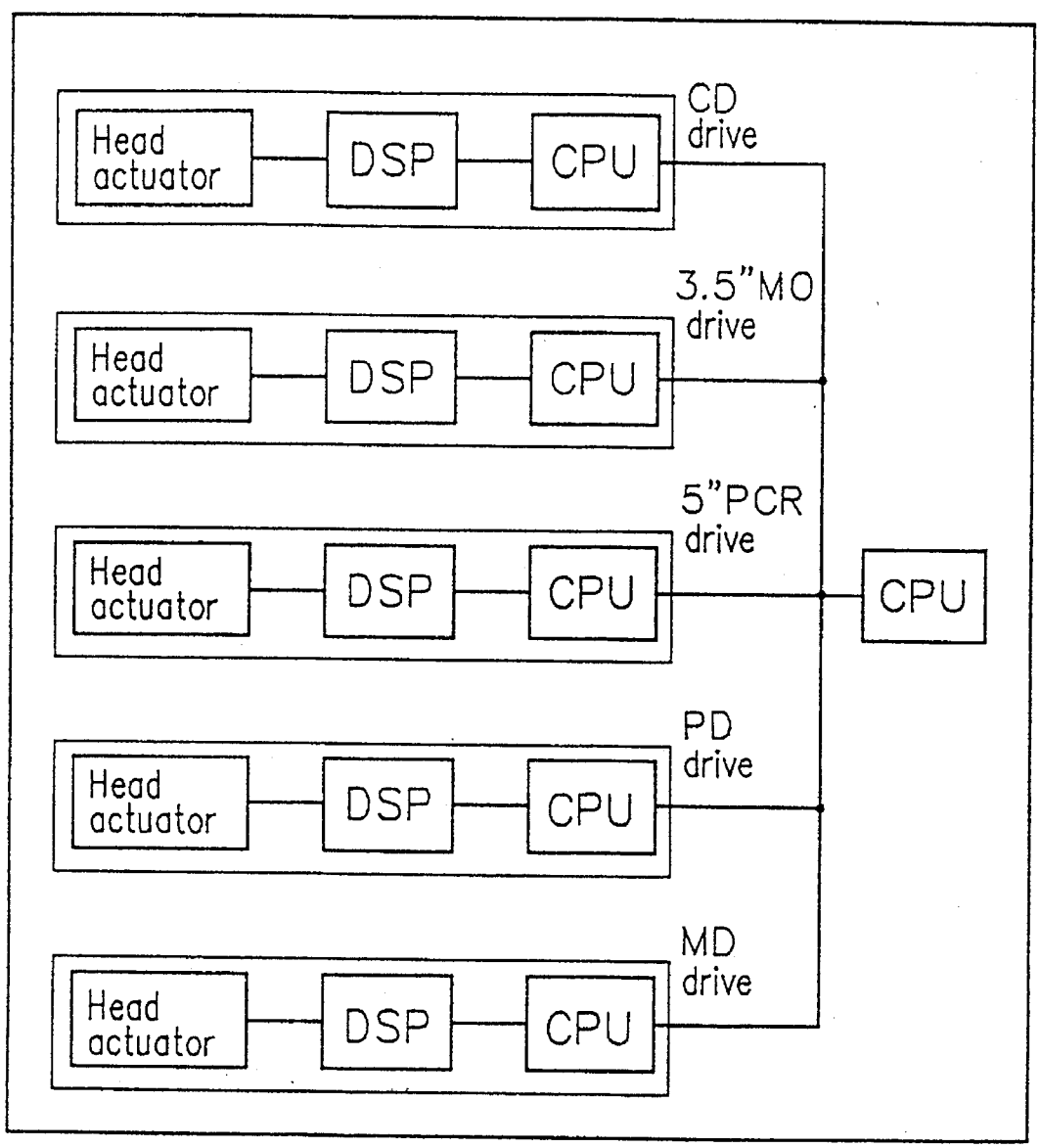
FIG. 11 is a block diagram showing a conventional optical recording/reproducing apparatus in which a plurality of disk drives are mounted.

FIG. 8 is a block diagram showing an exemplary configuration of a band rejection filter. As shown in FIG. 8, the band rejection filter includes delays 181 and 182 each indicated by $Z^{-1}$, multipliers 183, 184, 185, and 186, and adders 187, 188, 189, and 190. Multipliers e, f, g, and h of the multipliers 183 to 186 are the values which are set by the CPU 142. By changing these values, it is possible to change the trap center frequency in accordance with the characteristics of the head actuator. FIGS. 9A and 9B show the frequency characteristics of the band rejection filter when the trap center frequency is changed from f5 to f6.

These parameters for determining the filter characteristics are selected by the CPU 142 in accordance with the characteristics of the head actuator, and these parameters are written into the RAM of the DSP 141, as described above. If these parameters in the RAM are rewritten by the CPU 142, the characteristics of the filters in the DSP 141 can be desirably changed. The configurations of the filters in the DSP 141 are not limited to those described above. It is appreciated that if the processing by the software is changed, the configurations of filters are accordingly changed.

The gains of the gain changing circuits 128 and 135 shown in FIG. 2 are also changed in accordance with the characteristics of the head actuator, especially with the driving sensitivities of the focus actuator, the tracking actuator, and the linear motor. The change of gains in the gain changing circuit 128 and 135 is performed by changing values of multipliers used in multipliers which constitute the circuit, in the same way as in the change of filter coefficients.

In the above-described example, in order to simplify the description, it is assumed that the parameters which are transferred from the CPU 142 and then written in the RAM of the DSP 141 include the filter coefficients and gain values. However, in actuality, the parameters include parameters which are set in accordance with the kind of disk. One of the parameters is an attenuation amount in the attenuators 118, 119, and Some disks have different reflectivities. Such a disk requires different laser-light power for the reproducing or recording operation. Accordingly, the amount of light detected by the photodetectors 109 and 110 is varied depending on the disk that is to be used. This means that it is necessary to change the attenuation amount in the attenuators 118, 119, and 120 depending on the laser-light power. In addition, some types of disks use the land portion as the data area, and other types of disks use the groove portion as the data area. Accordingly, it is necessary to appropriately select the polarity in the polity switching circuit 124, depending on the types of disks in which either the land portion or the groove portion is used as the data area. The change of polarity can be performed by any known method. If, as described above, the signal applied to the polarity switching circuit 124 is a digital signal, it is possible to change the polarity by easy processing such as the calculation of the two's complement numbers.

Based on the apparatus information received from each DSP, the CPU determines the characteristics of the head actuator which is controlled by the DSP, and sets the parameters for filters and the like in the DSP in accordance with the determined result. The setting of parameters is performed by selecting one of a plurality of sets of parameters which are previously stored in the ROM of the CPU in accordance with the characteristics of the head actuator, and then by transferring the parameters of the selected set from the CPU to the RAM of the DSP. As a result, the coefficients of the filters, the gains of the gain changing circuit, the attenuation amount in the attenuators, and the like of each DSP can be set to optimal values in accordance with the characteristics of the head actuator which is controlled by the DSP. In this way, the CPU transfers sets of parameters to all DSPs in accordance with the characteristics of head actuators which are controlled by the DSPs, respectively. Accordingly, if there are a plurality of drives each including one head and one DSP, they can be controlled by one CPU because the DSPs in the all drives have the same hardware configuration. As a result, it is possible to provide an optical recording/reproducing apparatus with multiple functions at a low cost.

In the case where there is one drive, if the apparatus information is stored in the DSP, the coefficients of filters and the like of the DSP can be automatically set at the turning on of the power of the optical recording/reproducing apparatus. Accordingly, it is unnecessary to previously establish filters and circuits having characteristics according to the employed head actuator in the DSP. Therefore, it is unnecessary to individually design the hardware and software of DSPs for controlling head actuators having different specifications. In other words, DSPs which are constructed by the same hardware and software can be used for head actuators having any specifications.

As described above, according to the invention, the CPU receives specific apparatus information which is assigned to each disk drive, and sets parameters for determining the characteristics of filters, circuits, and the like of the DSP, in the RAM of the DSP. Accordingly, in the DSP, filters and circuits are automatically constructed so as to have optimal characteristics to the characteristics of the head actuator which is controlled by the DSP. As a result, an optimal control system to the characteristics of the head actuator is constructed in the DSP. Accordingly, conventional troublesome operations such as the change (rewriting) of the programs of the CPU or programs of the DSP in accordance with the type of apparatus (the kind of medium for recording and reproducing), grading-up in version, the change of specifications of head actuator, or the exchange of the DSP itself. Therefore, it is possible to improve the producibility of the optical recording/reproducing apparatus.

As described above, the parameters for filters, circuits, and the like in the DSP are set by the CPU when the power of the apparatus is turned on, so that it is unnecessary to use a specific DSP in accordance with the characteristics of each head actuator. DSPs having the same hardware configuration and the same software configuration can be used for any type of head actuators. As a result, it is unnecessary to provide CPUs for controlling the DSPs and a CPU for managing the control CPUs, and the control and management of all DSPs can be performed by one CPU. Accordingly, the production cost of such an apparatus having a complicated configuration and multiple functions can be reduced.

After the characteristics of the filters, circuits, and the like in the DSP 141 are determined in accordance with the above-described procedure, the CPU 142 starts the control for allowing the apparatus to be set in a state in which information can be recorded or reproduced. In this control, in the same way as in the conventional optical recording/reproducing apparatus, the CPU 142 first sends a series of commands such as focus-servo ON (FCON) and tracking-servo ON (TRON) to the DSP 141. When the DSP 141 receives the commands, it starts the operation of focus servo and tracking servo, whereby the light beam is made to follow the predetermined track on the disk 101. However, the sequence of the series of commands can be varied depending on the type of the disk, and the type of the apparatus. For example, in the case where information is to be reproduced from a CD, it is necessary to read the TOC area of the inner peripheral region. Accordingly, if the head is initially moved to the inner peripheral region at the turning on of the power, the optical recording/reproducing apparatus can be rapidly and efficiently set in the ready state. In the case of a disk onto which information can be recorded, positions of adjustment area and control tracks are varied depending on the kind of disk, so that the starting procedure is performed so that the head is initially moved to an outer or inner peripheral region, in accordance with the format of the disk.

During the production process of the apparatus, the EEPROM 143 may store parameters indicating kinds or characteristics of optical devices in the head such as the laser diode 104, the coupling lens 105, the polarization beam splitter 106, the objective lens 102, the collimator lens 107, the half mirror 108, and the photodetectors 109 and 110, or parameters indicating kinds or characteristics of the focus actuator and the tracking actuator. In such a case, after the CPU 142 sets the parameters for the filters, circuits, and the like in the DSP 141 at the turning on of the power of the apparatus, the CPU 142 reads the parameters stored in the EEPROM 143. Then, the CPU 142 accesses to the FLASHROM or the like in the CPU 142, and selects a set of parameters which is more suitable than the set of parameters which have been transferred to the DSP 141, or another set of parameters other than the set of parameters which have been set in the DSP 141. The parameters of the selected set are transferred to the DSP 141. In this way, the parameters which have been set based on the apparatus information of the DSP 141 are updated or added in accordance with the parameters from the EEPROM 143. Accordingly, the characteristics of the respective filters and circuits in the DSP 141 can be adapted to the variation in individual head actuators, and the control system in the DSP 141 can be a control system which is more suitable to the characteristics of the head actuator.

During the production and adjustment process of the head unit in the production process of the apparatus, if the adjustment values of the head at that time or the parameters indicating the characteristics of the head and the like are written in the EEPROM 143, the parameters of filters, circuits, and the like in the DSP 141 can be automatically adjusted for the head, simply by mounting the completed head unit to the disk drive. Accordingly, it is unnecessary to perform the adjustment, learning, or the like again in the apparatus for the head, after the head unit is mounted on the disk drive. In the case where the laser diode 104, or the actuators 103 and 131 are damaged in the head unit, and the head unit is exchanged, the parameters for determining the characteristics of the filters, circuit, and the like in the DSP 141 can be automatically changed for the new head unit. Thus, it is unnecessary to perform the adjustment operation for the new head unit. Accordingly, the maintenance of the optical recording/reproducing apparatus can be very easily performed.

In this example, the present invention has been described by way of an exemplary optical recording/ reproducing apparatus used for recording and/or reproducing information onto and/or from an optical disk. However, it is appreciated that as far as the apparatus optically performs the recording and reproducing to a recording medium such as a magneto-optical disk recording/reproducing apparatus, the same effects as those described in this example can be obtained irrespective of the kinds of the recording media.

In the above-described example, the main factors for changing the characteristics of the filters, circuits, and the like in the DSP 141 are that the characteristics are different for individual head actuators, and the kinds of media are different. However, it is understood that, in the case where the number of factors to be considered during the construction of the control system of the disk drive is increased, the number of sets of parameters which are previously stored in the FLASHROM of the CPU is accordingly increased, whereby the same effects as described in the example can be attained.

various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical recording/reproducing apparatus for optically recording information onto a recording medium and/or for optically reproducing the information from the recording medium, comprising:

converging means for converging a light beam on the recording medium;

moving means for moving the converging means;

variable control means for obtaining an amount of movement based on a signal obtained from the light beam reflected from the recording medium, and for controlling the moving means to move the converging means by the amount of movement; and a main control section for defining an operation for obtaining the amount of movement from the signal in accordance with characteristics of the converging means and the moving means and characteristics of the recording medium, and for controlling the variable control means to obtain the amount of movement by performing the defined operation.

2. An optical recording/reproducing apparatus according to claim 1, wherein the main control section includes;

first memory means for previously storing a plurality of parameter sets each including a plurality of parameters; and means for selecting one of the plurality of parameter sets in accordance with the characteristics of the converging means and the moving means and the characteristics of the recording medium, and for transferring the parameters of the selected set to the variable control means, thereby defining the operation for obtaining the amount of movement from the signal.

3. An optical recording/reproducing apparatus according to claim 2, wherein the variable control means includes second memory means for storing the parameters of the set transferred from the main control section.

4. An optical recording/reproducing apparatus according to claim 2, wherein the variable control means includes third memory means for previously storing apparatus information indicating the characteristics of the converging means and the moving means and the characteristics of the recording medium, and the main control section receives the apparatus information from the third memory means of the variable control means, determines the characteristics of the converging means and the moving means and the characteristics of the recording medium based on the received apparatus information, and selects one of the plurality of parameter sets based on the determined result.

5. An optical recording/reproducing apparatus according to claim 2, wherein the optical recording/reproducing apparatus includes a plural number of the converging means, a plural number of the moving means, and a plural number of the variable control means, the number of the moving means and the number of the variable control means being equal to the number of the converging means, the variable control means all having identical hardware, and the main control section selects and transfers, to each of the variable control means, one of the plurality of parameter sets in accordance with characteristics of corresponding converging means and moving means and characteristics of a corresponding recording medium.

6. An optical recording/reproducing apparatus according to claim 2, wherein the variable control means is a digital signal processor.

7. An optical recording/reproducing apparatus according to claim 6, wherein the digital signal processor includes a digital filter having a variable frequency characteristic, and the plurality of parameters include a coefficient which determines the frequency characteristic of the digital filter.

8. An optical recording/reproducing apparatus according to claim 6, wherein the digital signal processor includes a circuit for adjusting a gain of a signal, and the plurality of parameters include a value of the gain adjusted by the circuit.

9. An optical recording/reproducing apparatus according to claim 1, wherein the definition of the operation by the main control section in accordance with the characteristics of the converging means and the moving means and the characteristics of the recording medium is performed immediately after a power of the optical recording/reproducing apparatus is turned on, or immediately after the optical recording/reproducing apparatus is reset.

10. An optical recording/reproducing apparatus according to claim 1, wherein the recording medium is a magneto-optical disk.

11. An optical recording/reproducing apparatus according to claim 1, wherein the recording medium is an optical disk.

12. An optical recording/reproducing apparatus for optically recording information onto a recording medium and/or for optically reproducing the information from the recording medium, comprising:

converging means for converting a light beam on the recording means;

moving means for moving the converging means in a focus direction which is perpendicular to a surface of the recording medium, and in a tracking direction which is a radius direction of the recording medium;

variable control means for calculating an amount of movement in the focus direction and an amount of movement in the tracking direction by processing a signal obtained from the optical beam reflected from the recording medium by using a plurality of parameters, and for controlling the moving means to move the converging means by the amount of movement in the focus direction and the amount of movement in the tracking direction; and a main control section for setting the plurality of parameters in accordance with characteristics of the converging means and the moving means, and for applying the plurality of parameters to the variable control means.

13. An optical recording/reproducing apparatus according to claim 12, wherein the recording medium is an optical disk.

14. An optical recording/reproducing apparatus according to claim 12, wherein the recording medium is a magneto-optical disk.

* * * * *

UNITED STATES PATENT AND TRADEMARK OFFICE
CERTIFICATE OF CORRECTION

PATENT NO.    : 5,606,536

DATED         : February 25, 1997

INVENTOR(S)   : Katsuya Watanabe et al

It is certified that error appears in the above-identified patent and that said Letters Patent is hereby corrected as shown below:

Column 1, line 48, change "ON" to --ON--.

Column 1, line 49, change "end" to --and--.

Column 3, line 52, change "converting" to --converging--.

Column 7, line 56, change "The" to --the--.

Column 8, line 63, insert --120.-- between "and" and "Some".

In the Claims:

Claim 12, line 5, change "converting" to --converging--.

Signed and Sealed this

Twentieth Day of January, 1998

Attest:

BRUCE LEHMAN

Attesting Officer    Commissioner of Patents and Trademarks